United States Patent
Koll

[15] 3,640,461
[45] Feb. 8, 1972

[54] APPARATUS AND PROCESS FOR FORMING AND SPRAYING PESTICIDAL INVERT EMULSION

[72] Inventor: Laurel A. Koll, Ruleville, Miss.
[73] Assignee: Hercules Incorporated, Wilmington, Del.
[22] Filed: Sept. 26, 1969
[21] Appl. No.: 861,421

Related U.S. Application Data

[63] Continuation-in-part of Ser. No. 654,297, June 15, 1967, abandoned, which is a continuation-in-part of Ser. No. 564,861, July 13, 1966, abandoned.

[52] U.S. Cl. ................................239/7, 239/10, 239/304, 239/427
[51] Int. Cl. ..............................................B05b 7/04
[58] Field of Search.....................239/10, 171, 304, 427, 7

[56] References Cited

UNITED STATES PATENTS

| | | | |
|---|---|---|---|
| 3,197,299 | 7/1965 | Stull et al. | 239/171 X |
| 3,245,329 | 4/1966 | Nagin et al. | 239/304 X |
| 3,284,009 | 11/1966 | Stull et al. | 239/427 |
| 3,369,705 | 2/1968 | Curtis et al. | 239/304 X |
| 3,499,606 | 3/1970 | Smith | 239/171 X |
| 2,757,044 | 7/1956 | Gerbracht | 239/304 X |

Primary Examiner—M. Henson Wood, Jr.
Assistant Examiner—Michael Y. Mar
Attorney—George H. Hopkins

[57] ABSTRACT

Disclosed are an apparatus and a continuous process for making and spraying a pesticidal invert emulsion from a Newtonian-type aqueous phase and a Newtonian-type oil phase. In the apparatus and process the two phases are (a) introduced into a mechanical dispersing chamber and (b) established and maintained under hydrostatic pressure in said chamber sufficient to push from said chamber invert emulsion formed therein through a conduit to the outlet of a spray nozzle and out of said outlet as a spray. In the chamber the aqueous phase is mechanically dispersed in the oil phase at least until said invert emulsion is formed. Invert emulsion in the chamber is expelled therefrom to the outlet of said spray nozzle, and discharged as a spray into the atmosphere. In one embodiment the mechanical dispersing chamber is provided by a centrifugal pump with the requisite hydrostatic pressure for the most part being provided by pumps in the phase feed conduits to the centrifugal pump.

13 Claims, 1 Drawing Figure

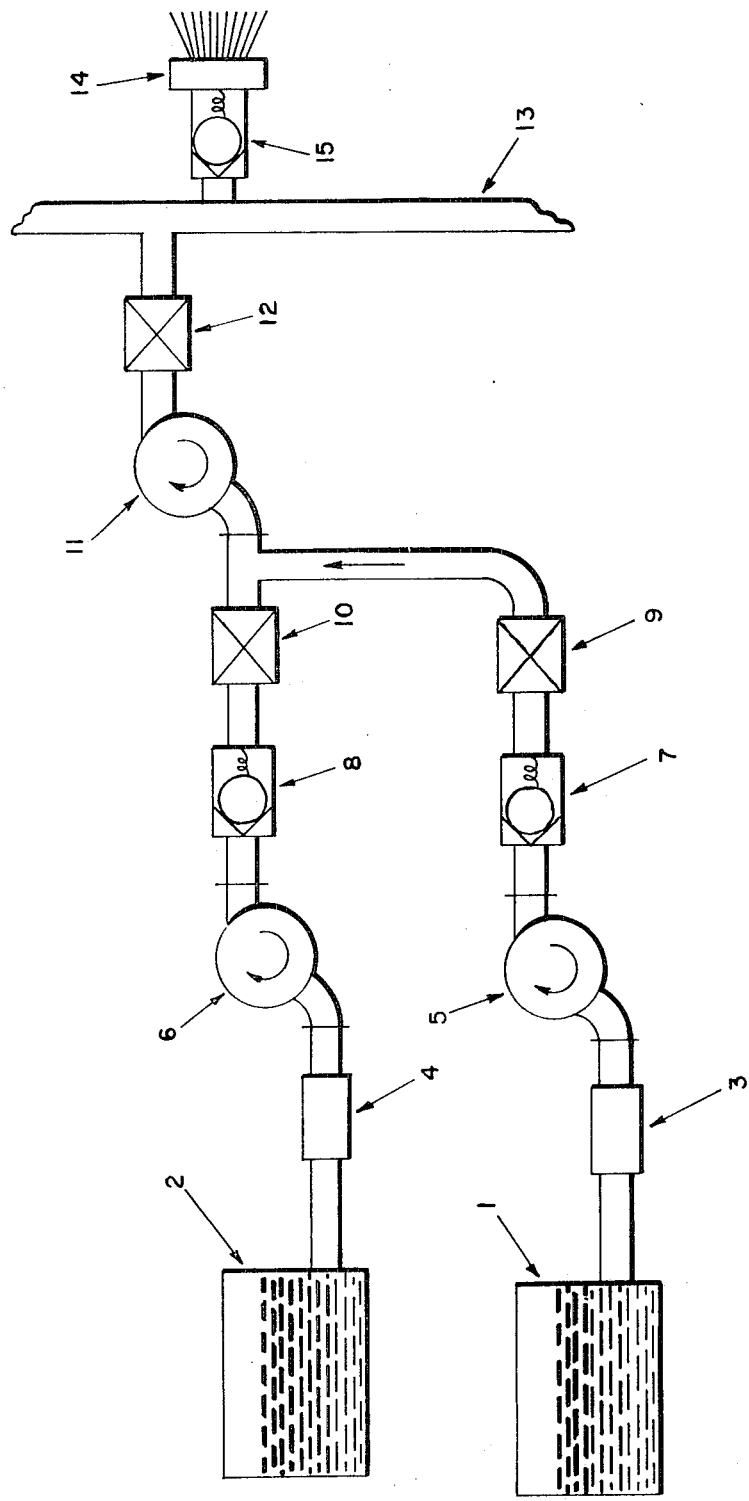
LAUREL A. KOLL
INVENTOR
BY
AGENT

APPARATUS AND PROCESS FOR FORMING AND SPRAYING PESTICIDAL INVERT EMULSION

The application is a continuation-in-part of the copending application, Ser. No 654,297, filed June 15, 1967, for Preparation of Invert Emulsion Spray and Equipment Therefor, now abandoned, which in turn is a continuation-in-part of the application, Ser. No. 564,861, filed July 13, 1966, for Preparation Of Invert Emulsion Spray And Equipment Therefor, which latter application was abandoned after the filing of the Ser. No. 654,297 application.

This invention is in the art of the spray application of pesticides. It relates to ways and means for forming and spraying pesticide-containing invert emulsions.

As is well known, frequently in the spraying of pesticides it is necessary or desirable to minimize, if not eliminate, wind drift of the pesticide containing spray droplets. This is especially so in the spray application of pesticides from aircraft, and in the spray application of pesticides that are herbicidal in effect. One approach to the problem of minimizing wind drift of pesticide sprays has been to incorporate the pesticides into water-in-oil emulsions and spray the emulsions. These emulsions, called invert emulsions, when sprayed, form relatively large droplets which are substantially less subject to wind drift than those from conventional emulsions and other Newtonian fluids. However, these emulsions also have plastic-type, non-Newtonian rheological properties. Emulsions with these properties are not suitable for conventional spray equipment and methods. Such equipment and methods require Newtonian-type emulsions. These are emulsions that are highly fluid and like water in flow behavior. Consequently, there has been developed a multifluid nozzle process in which the invert emulsion is hydraulically formed in a chamber in the spray nozzle and discharged from the nozzle outlet as a spray. However, the multifluid nozzle process requires "flash" or almost instantaneous formation of the emulsion, because of the short residence time of the oil and aqueous phases in the nozzle chamber. As a result, relatively large concentrations of highly efficient emulsifying agents are required in either or both of the oil and aqueous phases. Moreover, the multifluid nozzle process requires careful control of rates of flow of the oil and aqueous phases to the nozzle to assure uniform application rates of pesticides, and to avoid sudden changes in the rheological properties of the emulsion.

This invention overcomes these disadvantages of the multifluid nozzle apparatus and process.

In summary, this invention comprises a process and an apparatus for making and spraying a pesticidal invert emulsion from a Newtonian-type aqueous phase and a Newtonian-type oil phase, at least one of said phases containing a solution pesticidal material at an effective concentration, and at least one of said phases containing in solution at an effective concentration emulsifier material that promotes the formation of a water-in-oil emulsion when said aqueous phase is intimately or finely dispersed in said oil phase.

In the process of this invention, (1) the Newtonian-type aqueous phase and the Newtonian-type oil phase are (a) introduced into a mechanical dispersing chamber, and (b) established and maintained at a hydrostatic pressure in said chamber sufficient to push from said chamber invert emulsion formed therein through a conduit to the outlet of a spray nozzle and out of said outlet as a spray, (2) the aqueous phase is mechanically dispersed in the oil phase in said chamber at least until said invert emulsion is formed, and (3) invert emulsion formed in the mechanical dispersing chamber is expelled therefrom through said conduit to said outlet and discharged to the atmosphere as a spray.

In one practice of the process, the aqueous phase and the oil phase are separately introduced into the mechanical dispersing chamber. However, in a preferred practice of the process of this invention the aqueous phase and oil phase are mingled just sufficiently to form a Newtonian-type liquid mixture, and the liquid mixture is introduced into the mechanical dispersing chamber.

In one practice of the process of this invention the required hydrostatic pressure is established and maintained by pump action in the mechanical dispersing chamber. In such practice the mechanical dispersing chamber is provided by a pump such as a centrifugal pump, gear pump, or the like. The mechanical dispersion of the aqueous phase in the oil phase is achieved by the pump action which comprises a mechanical mixing effect. In another practice of the process of this invention, the aqueous phase and the oil phase are separately established and maintained at said hydrostatic pressure prior to introduction into the mechanical dispersing chamber. In still another practice of the inventive process, the aqueous phase and the oil phase are mingled just sufficiently to form a Newtonian-type liquid mixture and the liquid mixture prior to introduction into the mechanical dispersing chamber is established and maintained at said hydrostatic pressure. In yet another practice of the process of this invention, prior to introduction into the chamber, the aqueous phase and the oil phase separately or together in a Newtonian-type liquid mixture are established and maintained at a hydrostatic pressure substantially higher than atmospheric pressure, but less than the required hydrostatic pressure, and in the mechanical dispersing chamber established and maintained at the higher required hydrostatic pressure.

In the process of this invention the volumetric ratio of the aqueous phase to the oil phase is in a general range from about 1:1 to about 24:1, and preferably from about 1:1 to about 7:1. However, operable higher and lower volumetric ratios are within the broader concepts of this invention.

Spray-type pesticidal invert emulsion formulations such as disclosed in the U.S. Pat. No. 3,197,299, to Stull et al., are employed in the practice of this invention. Typically, the oil phase is a formulated composition consisting essentially of oil, pesticide material and emulsifier material that promotes the formation of a water-in-oil emulsion. In some preferred embodiments it also comprises wetting agent material and spreader-sticker material. The aqueous phase usually comprises only water, but in some embodiments it may contain in solution water-soluble pesticide material, water-in-oil emulsion promoting emulsifier material, and the like. As used herein pesticide material is material that consists essentially of a pesticide. In some embodiments it comprises only one pesticide. In other embodiments it comprises two or more pesticides. Emulsifier material is material that consists essentially of an emulsifier. In some embodiments it comprises only one emulsifier. In other embodiments it comprises two or more emulsifiers.

A typical oil phase composition for invert emulsion sprays consists essentially of the following components at the indicated concentrations in percent by weight of the oil phase composition:

| Components | Weight Percent (%) |
| --- | --- |
| Oil | 10–90 |
| Water-in-oil Emulsion Promoting Emulsifier Material | 5–35 |
| Pesticide material | 10–60 |

Oils which can be used along or in mixture in such a composition include light petroleum distillates, fuel oil, diesel oil, kerosene, crude aromatic distillates, and xylenes. The water-in-oil emulsion promoting emulsifier material includes one or more emulsifying agents such as, for example, long-chain fatty amines, salts of long-chain fatty amines, the alkanol-amides of long-chain fatty acids, and the like. Examples of pesticides frequently used in such a composition include such herbicides as 2,4-D acid, 2,4,5-T acid, and amine salts and alkyl esters thereof, and the like, and such insecticides as DDT, malathion, toxaphene, and the like.

The apparatus of this invention in general comprises reservoir means for the aqueous phase and the oil phase, mechanical dispersing means providing a mechanical dispersing chamber with inlet means and outlet means, invert emulsion spray-forming means, feed conduit means for delivering the aqueous phase and the oil phase from the reservoir means to said inlet means, and invert emulsion delivery conduit means for conveying invert emulsion expelled from said outlet means to said spray-forming means. Preferably the invert emulsion delivery conduit means are adapted as by flow control valve means, a suitable cross-sectional area or the like to retain the two phases in said mechanical dispersing means until at least said invert emulsion has been formed therefrom therein.

In one embodiment of this invention the aqueous phase and oil phase arrive at said inlet means by gravity flow, the hydrostatic pressure or head at said inlet means being sufficient to propel invert emulsion from said outlet means to said outlet of said spray-forming means.

In another embodiment of this invention the mechanical dispersing means also function as a pump. Under normal operative conditions both phases are sucked through said conduit means from said reservoir means to said inlet means, and through said inlet means into the interior of said mechanical dispersing means, and invert emulsion is expelled through said outlet means the invert emulsion conduit means, and the invert emulsion spray-forming means so that the invert emulsion emerges as a spray.

In still another embodiment the conduit means from the reservoir means to the inlet means of the mechanical dispersing means comprise for at least one phase and preferably for each phase a pump for imparting to the two phases at least a substantial portion, if not substantially all of the required hydrostatic pressure. Each phase pump can be a conventional pump such as, for example, a centrifugal pump, gear pump, positive displacement pump, or the like.

The mechanical dispersing means in these embodiments of this invention preferably comprise a centrifugal pump.

The best mode now contemplated for carrying out this invention is illustrated in the drawing which forms a material part of these disclosures.

In brief, the drawing diagrammatically depicts a preferred specific embodiment of the apparatus of this invention, which is particularly useful in aircraft.

In greater detail, the drawing illustrates a specific embodiment of an apparatus for forming and spraying a pesticidal water-in-oil emulsion characterized by relatively thick, creamy, mayonnaiselike consistency and by non-Newtonian plastic type, rheological properties. This apparatus in general comprises, an oil-phase reservoir 1, an aqueous-phase reservoir 2, oil-phase and aqueous-phase filters 3 and 4, an oil-phase pump 5, an aqueous-phase pump 6, an oil-phase check valve 7, an aqueous-phase check valve 8, an oil-phase metering valve 9, an aqueous-phase metering valve 10, and a mechanical disperser 11.

The lower portion of the water-phase reservoir 2 has an outlet which is connected by a conduit to the inlet of the oil-phase filter 4. The outlet of this filter is connected by a conduit to the intake of the water-phase pump 6. The discharge of the water-phase check valve 8, the outlet of which is connected by a conduit to the inlet of the water-phase metering valve 10. The outlet of this metering valve is connected to the inlet of the mechanical disperser 11 by a conduit which preferably comprises a tee fitting 16.

The oil-phase reservoir 1 has an outlet in the lower portion thereof which is connected by a conduit to the inlet of the oil-phase filter 3. The outlet of this filter is connected by the conduit to the intake of the oil-phase pump 5. The discharge of oil-phase pump 5 is connected by a conduit to inlet of the oil-phase check valve 7, the outlet of which is connected by a conduit to the inlet of the oil-phase metering valve 9. The outlet of this valve is connected by a conduit to the lateral inlet of the tee fitting 16 in the conduit leading from the outlet of the water-phase metering valve 10 to the inlet of the mechanical disperser 11.

The mechanical disperser 11 in this embodiment is a centrifugal pump of low pumping efficiency. The outlet of the mechanical disperser 11 is connected by a conduit to the inlet of the invert emulsion metering valve 12. The outlet of this valve is connected to a conduit to a manifold of "spray boom" 13 which has one or more spraying tips or spray-forming nozzles 14, each of which preferably is fitted with a check valve 15.

Under normal operative conditions of the apparatus of the drawing, oil phase is withdrawn by oil-phase pump 5 from the oil-phase reservoir 1 through the oil-phase filter 3 into the pump and impelled through the oil-phase check valve u, oil-phase metering valve 9 and tee fitting 16 into the intake of the mechanical disperser 11. At the same time aqueous phase is withdrawn by the aqueous-phase pump 6 from the aqueous-phase reservoir 2 through the aqueous-phase filter 4 to the pump and impelled from the pump through aqueous-phase check valve 8 and aqueous-phase metering valve 10 into the tee fitting 16. The volumetric ratio of aqueous phase and oil phase reaching the tee fitting 16 is controlled by metering valves 9 and so as to be in the general range from about 1:1 to bout 24:1. In the tee fitting 16, the aqueous phase meets the oil phase and the two phases in their passage to the mechanical disperser 11 mingle to form a Newtonian nonemulsified liquid mixture. Inside the mechanical disperser 11 the water phase in the liquid mixture is mechanically dispersed into the oil phase and, because of hydrostatic pressure contributed by the two pumps and the mechanical disperser 11, the invert emulsion that is formed is pushed out of the mechanical disperser 11 outlet through the invert emulsion metering valve 12 into the manifold or spray boom 13 and out of the boom 13 through each spray nozzle check valve 15 to each spray-forming top 14. At each tip, the invert emulsion is discharged into the atmosphere as a spray with wind drift resistant properties.

The residence time (of the order of 1 second or less) of the mingled water phase and oil phase in the mechanical disperser 11, and the extent of dispersion of the water phase in the oil phase are regulated by the invert emulsion control valve 12.

The consistency of the invert emulsion is a function of the water content, the residence time of the two phases in the mechanical disperser 11 and the emulsifier material concentration.

In other embodiments of the apparatus of this invention, flow of the water content, the residence time of the two phases in flow of water phase and oil phase to the inlet of the mechanical disperser is achieved by gravity, by gravity relative to one phase and by a pump relative to the other phase, or by the suction of mechanical disperser 11.

Also, in other embodiments one or the other of the oil-phase and water-phase metering valves 7 and 8 is omitted. In one embodiment wherein the mechanical disperser 11 is a centrifugal pump and it is the only pump in the apparatus, the invert emulsion metering valve 12 is preferably omitted, but both the oil-phase and water-phase metering valves 7 and 8 or the like are preferably present. In this embodiment the fineness of dispersion of the water phase in the oil phase is controlled by regulation of the oil-phase and water-phase metering valves 7 and 8 so that not only is the volumetric ratio regulated, but also the total volume of the two phases.

As before indicated the specific apparatus illustrated in the drawing is particularly useful for aircraft. On the other hand it can be transported by a ground vehicle such as, for example, trailer, truck or railroad car. When employed in an aircraft, it is mounted in any suitable manner, and the spray boom or manifold 13 is mounted, for example, as shown in the U.S. Pat. No. 3,197,299, to Stull et al. The pumps 5 and 6 and the mechanical disperser 11 can be driven by one or more air-driven fans. On the other hand, they can be driven by electric motors.

A feature of advantage of the process and apparatus of this invention is that the invert emulsion is formed only during actual spraying operations and only in amounts required for the spraying operation. Economies in spraying, therefore, result from the system of this invention, just as they do in the multifluid nozzle system.

However, the system of this invention is an improvement over the multifluid nozzle system in that invert emulsion of more uniform consistency is obtained in the mechanical disperser, the emulsifier material functions more efficiently, and a smaller concentration of emulsifier material, depending on rates of flow of the oil phase and water phase through the mechanical disperser, is required.

Still another feature of advantage of the apparatus and process of this invention is that more uniform flow of invert emulsion spray from the nozzles is accomplished.

Yet another feature of advantage of the process of this invention is that an invert emulsion with a greater water content can be obtained with less emulsifier material than with the multifluid mixing nozzle process.

Hence, this invention provides new and useful process and apparatus.

Other features, advantages and specific embodiments of this invention will be readily apparent to those exercising ordinary skill in the art after reading the foregoing disclosures. Such specific embodiments are within the scope of this invention. MOreover, while a specific embodiment of this invention has been described in considerable detail, variations and modifications of this embodiment can be effected without departing from the spirit and scope of the invention.

What I claim and desire to protect by Letters Patent is:

1. A continuous process for making and spraying a pesticidal invert emulsion from a Newtonian-type aqueous phase and a Newtonian-type oil phase, at least one of said phases containing in solution pesticide material at an effective concentration, and at least one of said phases containing at an effective concentration emulsifier material that promotes the formation of a water-in-oil emulsion when said aqueous phase is finely dispersed in said oil phase, which comprises: introducing said phases into a mechanical dispersing chamber at a volumetric ratio effective for the formation of invert emulsion, while establishing and maintaining said phases under sufficient hydrostatic pressure in said chamber to push from said chamber invert emulsion formed therein through a conduit to the outlet of a spray nozzle and out of said outlet as a spray; in said chamber mechanically dispersing said aqueous phase in said oil phase at least until said invert emulsion is formed; and conducting invert emulsion from said chamber through a conduit to the outlet of a spray nozzle and out of said outlet as a spray.

2. A continuous process according to claim 1, wherein said volumetric ratio is in a range from about 1:1 to about 24:1.

3. A continuous process according to claim 2, wherein said volumetric ratio is in a range from about 1:1 to about 7:1.

4. A continuous process according to claim 3, wherein said phases are mingled just sufficiently to form a Newtonian-type liquid mixture, nd said phases are introduced into said mechanical dispersing chamber by way of said mixture.

5. A continuous process according to claim 3, wherein prior to introduction into said chamber said phases are established and maintained at an initial hydrostatic pressure at least greater than atmospheric pressure and at most substantially at said sufficient hydrostatic pressure, and in said chamber said phases are established and maintained under such additional hydrostatic pressure that the total hydrostatic pressure of said phases in said chamber is at least said sufficient hydrostatic pressure.

6. A continuous process according to claim 5, wherein said mechanical dispersing chamber is provided by a pump, and the mechanical dispersing of said aqueous phase in said oil phase is provided by the pump action of said pump.

7. A continuous process according to claim 6, wherein said pump is a centrifugal pump.

8. Apparatus for making and spraying pesticidal invert emulsion from a Newtonian-type aqueous phase and a Newtonian-type oil phase, at least one of said phases containing in solution pesticide material at an effective concentration, and at least one of said phases containing at an effective concentration emulsifier material that promotes the formation of a water-in-oil emulsion when said aqueous phase is finally dispersed in said oil phase, which comprises: reservoir means for said aqueous phase and said oil phase; mechanical dispersing means having inlet means and outlet means; spray-forming means; feed conduit means for delivering said aqueous phase and said oil phase from aid reservoir means to said inlet means; said feed conduit means comprising pump means; and invert emulsion delivery conduit means for passing invert emulsion expelled from said outlet means to said spray-forming means, said invert emulsion delivery conduit means comprising valve means for regulating the flow of invert emulsion from said mechanical dispersing means to said spray-forming means, and thereby the residence time of said aqueous phase and said oil phase and the resulting invert emulsion in said mechanical dispersing means.

9. Apparatus according to claim 8, wherein said feed conduit means comprise separate feed conduits for said phases, which separate feed conduits join with a common conduit in combination with said inlet means.

10. Apparatus according to claim 9, wherein said mechanical dispersing means comprise a pump.

11. Apparatus for making and spraying pesticidal invert emulsion from a Newtonian-type aqueous phase and a Newtonian-type oil phase, at least one of said phases containing in solution pesticide material at an effective concentration, and at least one of said phases containing at an effective concentration emulsifier material that promotes the formation of water-in-oil emulsion when said aqueous phase is finely dispersed in said oil phase, which comprises: reservoir means for said aqueous phase and said oil phase; centrifugal pump means having inlet means and outlet means; spray-forming means; feed conduit means for delivering said aqueous phase and said centrifugal pump; and invert emulsion delivery conduit means for passing invert emulsion expelled from said outlet means to said spray-forming means.

12. Apparatus according to claim 11, wherein said feed conduit means for delivering said aqueous phase to said inlet means include pump means.

13. Apparatus according to claim 11, in which said feed conduit means for delivering said oil phase to said inlet means include pump means.

* * * * *

PO-1050
(5/69)

UNITED STATES PATENT OFFICE
CERTIFICATE OF CORRECTION

Patent No. 3,640,461      Dated February 8, 1972

Inventor(s) Laurel A. Koll (Case 1-2-3)

It is certified that error appears in the above-identified patent and that said Letters Patent are hereby corrected as shown below:

Column 3, line 60, between "water-phase" and "check valve 8" insert --pump is connected by a conduit to the inlet of the water phase--

Column 4, line 5, first occurrence, "to a" should read --by a--

Column 4, line 5, "of" should read --or--

Column 4, line 12, "u" should read --7--

Column 4, line 21, between "and so" insert --10--

Column 4, line 22, "bout" should read --about--

Column 4, line 33; "top" should read --tip--

Column 4, lines 44 and 45, omit "content, the residence time of the two phases in flow of water"

Column 5, line 3 of Claim 4, "nd" should read --and--

Column 6, line 12 of Claim 8, "aid" should read --said--

Column 6, line 12 of Claim 11, after the word "said" insert --oil phase from said reservoir means to said inlet means of said--

Signed and sealed this 20th day of June 1972.

(SEAL)
Attest:

EDWARD M. FLETCHER, JR.
Attesting Officer

ROBERT GOTTSCHALK
Commissioner of Patents

PO-1050
(5/69)

UNITED STATES PATENT OFFICE
CERTIFICATE OF CORRECTION

Patent No. 3,640,461          Dated February 8, 1972

Inventor(s) Laurel A. Koll

It is certified that error appears in the above-identified patent and that said Letters Patent are hereby corrected as shown below:

In column 6 at line 49 (line 12 of claim 11)
       after "pump" insert --means--.

Signed and sealed this 5th day of December 1972.

(SEAL)
Attest:

EDWARD M. FLETCHER, JR.          ROBERT GOTTSCHALK
Attesting Officer                Commissioner of Patents